United States Patent [19] [11] 3,711,614
Osieka et al. [45] Jan. 16, 1973

[54] METHOD OF CONTROLLING FUNGI IN PLANTS AND SEEDS USING ORTHO-SUBSTITUTED BENZOATES AND THIOBENZOATES

[75] Inventors: Hans Osieka, Ludwigshafen; Karl-Heinz Koenig, Frankenthal; Ernst-Heinrich Pommer, Limburgerhof, all of Germany

[73] Assignee: Badische-Anilin- & Soda-Fabrik Aktiengesellschaft, Ludwigshafen/Rhine, Germany

[22] Filed: Sept. 17, 1969

[21] Appl. No.: 858,838

[30] Foreign Application Priority Data

Sept. 24, 1968 Germany....................P 17 93 480.4

[52] U.S. Cl. ...................424/308, 424/309, 424/357
[51] Int. Cl. ............................A01n 9/20, A01n 9/12
[58] Field of Search...............................424/308, 309

[56] References Cited

UNITED STATES PATENTS

| | | | |
|---|---|---|---|
| 2,875,122 | 2/1959 | Kosmin | 424/308 |
| 3,522,291 | 7/1970 | Bimber | 424/308 X |

OTHER PUBLICATIONS

C. Haerdtl Chem. Abs. 1964, Vol. 60, pp. 8,374 and 8,375

*Primary Examiner*—Albert T. Meyers
*Assistant Examiner*—Dale R. Ore
*Attorney*—Johnston, Root, O'Keeffe, Keil, Thompson & Shurtleff

[57] ABSTRACT

A process for protecting objects against fungi attack by treating the objects with a fungitoxic amount of a substituted benzoic ester.

3 Claims, No Drawings

METHOD OF CONTROLLING FUNGI IN PLANTS AND SEEDS USING ORTHO-SUBSTITUTED BENZOATES AND THIOBENZOATES

The present invention relates to fungicides containing substituted benzoic acids as active ingredients.

It is known to use tetramethylthiuram disulfide for controlling fungi; however, its action is not always satisfactory.

We have now found that compounds having the formula

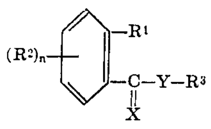

where $R^1$ denotes a lower alkyl radial (methyl, ethyl, propyl, isopropyl, butyl, sec-butyl, isobutyl, tert-butyl), halogen (preferably chlorine, bromine, iodine), a trifluoromethyl, nitro, amino, alkylamino (methylamino, ethylamino, propylamino, butylamino), dialkylamino (dimethylamino, diethylamino, dipropylamino), carboxy, acylamino (formylamino, acetyl, propionyl, butyryl, valeryl), alkoxycarbonyl (methoxycarbonyl, ethoxy, propoxy), aryloxycarbonyl (phenoxycarbonyl), thiocyano, mercapto, cyano, hydroxymethyl, chloromethyl, cyanomethyl or an alkoxy radical (methoxy, ethoxy), $R^2$ has the same meanings as $R^1$ but does not mean chlorine, $R^1$ and $R^2$ being identical or different, $n$ denotes one of the integers 0, 1 and 2 and if $n$ denotes 2, the two $R^2$ substituents may be identical or different, $R^3$ denotes a linear or branched alkyl radical (one to 18 carbon atoms) which may be substituted by halogen (preferably chlorine and bromine), alkoxy (methoxy, ethoxy, propoxy, isopropoxy, butyloxy, isobutyloxy, sec-butyloxy, pentyloxy, hexyloxy), chloroalkoxy (chloroethyloxy), alkylthio (methylthio, ethylthio, propylthio, butylthio), alkenylthio (allylthio), alkylsulfonyl (methylsulfonyl, ethylsulfonyl, propylsulfonyl, butylsulfonyl), alkylsulfynyl (methylsulfynyl, ethylsulfynyl, propylsulfynyl, butylsulfynyl), cyano, monoalkylamino or dialkylamino (methylamino to butylamino, dimethylamino) or mercapto, the radical

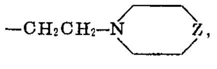

Z denoting oxygen or a nitrogen atom which may be substituted by a lower alkyl group (methyl, ethyl), an alkenyl or alkynyl radical having three to six carbon atoms (alkyl, buten-2-yl-1, methallyl, 2-methylbuten-1-yl-4, propargyl, butyn-1-yl-3, 3-methylbutyn-1-yl-3, 3-methylpentyn-1-yl-3), a cycloalkyl radical or a polycycloalkyl (up to tetracyclo) radical (bicyclo-[2,2,1]-heptyl radical, cyclohexyl radical, tetrahydrodicyclopentadienyl radical, tetracyclo-[6,2,1,1 $^{3,6}$ 0 $^{2,7}$]- dodecyl radical), a phenyl radical, the benzyl radical, a phenyl radical which may be substituted up to three times by alkyl (one to nine carbon atoms, methyl, ethyl, propyl, isopropyl, butyl, tert-butyl, isobutyl, sec-ethyl, isooctyl, isononyl), up to five times by halogen (preferably chlorine), up to twice by nitro, amino, monoalkylamino or dialkylamino (methylamino, allylamino, dimethylamino, diethylamino), acylamino (acetylamino, propionylamino), the acyl group (acetyl, propionyl), alkoxy (methoxy, ethoxy, propoxy, butoxy, tert-butoxy) alkylthio (methylthio, ethylthio), phenyl, carboxyl, cyano, thiocyano, trifluoromethyl, formyl, the sulfonic acid radical, the radical

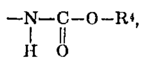

$R^4$ denoting a lower alkyl radical having up to five carbon atoms (methyl, ethyl, propyl, isopropyl, butyl), the radical

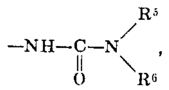

$R^5$ and $R^6$ denoting hydrogen or lower alkyl radicals having up to five carbon atoms (methyl, ethyl, propyl, butyl, isobutyl, amyl), or the radical

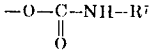

$R^7$ denoting a lower alkyl radical having up to five carbon atoms (methyl, ethyl, propyl, butyl, amyl) or a phenyl radical, and X and Y denote oxygen or sulfur, have a good action on injurious fungi, particularly on those belonging to the basidiomycetes class, e.g. *Rhizoctonia solani*, *Coniophora cerebella*, *Sclerotium rolfsii*, *Tilletia tritici*). The active ingredients are suitable for protecting plants, seeds and seedlings against fungus attack.

The active ingredients according to the invention may be prepared in simple manner, e.g. by reacting the corresponding substituted benzoic halides with the corresponding alcohols or thioalcohols or phenols. Their preparation is illustrated by way of the following examples.

Production of thiomethyl 2,3-dimethylbenzoate 16.8 parts by weight of 2,3-dimethylbenzoic chloride is dripped, at 5°C, into a solution of 5 parts by weight of methyl mercaptan in 50 parts by weight of dioxane, in the presence of 10.1 parts by weight of triethylamine, and the whole subsequently heated at 60°C. After 3 hours, the triethylamine hydrochloride formed is separated by suction filtration, the filtrate is washed with ether and dilute hydrochloric acid, the ether phase is washed twice with water and dried over calcium chloride, and the solvents subsequently evaporated off in vacuo. Thiomethyl 2,3-dimethylbenzoate is obtained by distillation in yield of 95 percent of the theory; b.p. (0.4 mm) = 96° to 97°C; $n_D^{25}$ = 1.5735.

Production of isobutyl o-methylbenzoate 15.5 parts by weight of o-methylbenzoic chloride is dripped at room temperature into a solution of 7.4 parts by weight of isobutanol and 10.1 parts by weight of triethylamine in 100 parts by weight of dioxane and the whole subsequently stirred for 3 hours at 60°C. The hydrochloride formed is separated by suction filtration, ether and dilute hydrochloric acid are added to the filtrate, the ether phase is dried over sodium sulfate after washing twice with water, and the residue, after concentrating the solution in vacuo at 40°C, is purified by distillation.

Yield: 93 percent of the theory; b.p.(0.1 mm) = 71°C; $n_D^{25}$ = 1.4980.

Production of thiooctyl o-chlorobenzoate 17.5 parts by weight of o-chlorobenzoic chloride is dripped at room temperature into a solution of 14.6 parts by weight of octyl mercaptan and 10.1 parts by weight of triethylamine in 100 parts by weight of toluene and the whole subsequently kept at a temperature of 60°C for 3 hours. After the triethylamine hydrochloride has been suction filtered, the filtrate is washed with dilute hydrochloric acid and extracted with ether, the ether phase is washed twice with water, dried with calcium chloride and distilled.

Yield: 94.5 percent of the theory; b.p. (0.1 mm) = 149° to 151°C; $n_D^{25}$ = 1.5352.

Production of 2′-isopropyl-5′-methylphenyl 2-methylbenzoate 15.0 parts by weight of 2-isopropyl-5-methylphenol and 10.1 parts by weight of triethylamine in 100 parts by weight of dioxane are placed in a vessel, 15.5 parts by weight of o-methylbenzoic chloride is added at room temperature and the whole subsequently kept for 3 hours at 60°C. Distillation is carried out after the isolation procedure as described above.

Yield: 85 percent of the theory; b.p. (0.2 mm): 135°C; $n_D^{25}$ = 1.5496.

Examples of other active ingredients which may be prepared by the above methods are as follows:

| | |
|---|---|
| methyl-2-nitrobenzoate | b.p.(1 mm) 122° to 124°C, $n_D^{25}$=1.5338 |
| 3′-methylphenyl-2-chlorobenzoate | b.p.(0.1 mm) 138°C to 140°C, $n_D^{25}$ = 1.5768 |
| thioisopropyl-2-nitrobenzoate | b.p.(0.1 mm) 126° to 128°C, $n_D^{25}$=1.5625 |
| propyl-2-nitrobenzoate | b.p.(23 mm)175° to 177°C, $n_D^{25}$=1.5157 |
| thiomethyl-2-chloro-5-nitrobenzoate | m.p.72° to 74°C |
| phenyl-2-methylbenzoate | b.p.(0.2 mm)119°C, $n_D^{25}$= 1.5722 |
| thiophenyl-2-chlorobenzoate | m.p. 54° to 56°C |
| isobutyl-2-chlorobenzoate | b.p.(20 mm)150°to 152°C, $n_D^{25}$=1.5085 |
| isobutyl-2-nitrobenzoate | b.p.(0.5 mm)127°C, $n_D^{25}$ = 1.5098 |
| thioethyl-2 -chlorobenzoate | b.p.(0.1 mm)81°to 83°C, $n_D^{25}$= 1.5740 |
| thioisopropyl 2-chlorobenzoate | b.p. (0.1mm)88°Bto 90°C, $n_D^{25}$=1 .5595 |
| methyl-2-methylbenzoate | b.p.(38 mm)117°C, $n_D^{25}$ = 1.5168 |
| thiomethyl-2-methylbenzoate | b.p.(0.1 mm)69°to 70°C, $n_D^{25}$ = 1.5754 |
| thiomethyl-2-chlorobenzoate | b.p.(0.1 mm)80°to 83°C, $n_D^{25}$ = 1.5915 |
| thiomethyl-2-nitrobenzoate | m.p.60° to 61°C |
| ethyl-2-methylbenzoate | b.p.(30 mm) 123° to 126°C,$n_D^{25}$=1.5059 |
| propyl-2-methylbenzoate | b.p.(20 mm)128°to 129°C,$n_D^{25}$= 1.5021 |
| thioethyl-2-chlorobenzoate | b.p.(0.1 mm)81°to 83°C, $n_D^{25}$= 1.5740 |
| isopropyl-2-methylbenzoate | b.p.(18mm)116°C, $n_D^{25}$ = 1.5012 |
| allyl-2-methylbenzoate | b.p.(14 mm)112°to 113°C, $n_D^{25}$=1.5190 |
| thiododecyl-2-chlorobenzoate | b.p.(0.1mm)147°to 151°C, $n_D^{25}$=1.5310 |
| thiooctyl-2-nitrobenzoate | b.p.(0.1mm)166°to 168°C, $n_D^{25}$=1.5362 |
| 2′, 3′, 4′, 5′, 6′-pentachloro - phenyl-2-nitrobenzoate | m.p.188°C to 189°C |
| 4′-isooctylphenyl-2-methylbenzoate | m.p. 69° to 70°C |
| methyl-2-aminobenzoate | b.p. (15 mm) 135.5°C, $n_D^{25}$= 1.5805 |

The fungicides according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons, such as tetrahydronaphthalene, and alkylated naphthalenes are suitable.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents. Concentrates which are suitable for dilution with water may be prepared from active ingredient, emulsifying or dispersing agent and possibly solvent.

Dusts may be prepared by mixing or grinding the active ingredients with a solid carrier.

The following comparative experiments demonstrate the superior fungicidal properties of the compositions according to this invention over known active ingredients.

EXAMPLE 1

The active ingredients were dissolved in acetone in amounts of 0.025 and 0.01 percent by weight and uniformly distributed in a still liquid malt nutrient agar. The agar was poured into Petri dishes having a diameter of 5 cm. After solidification of the agar, the dishes were centrally inoculated with mycelium flakes of *Rhizoctonia solani*. The dishes were incubated at 25°C and the extent of the development of the fungus colony ascertained after 4 days.

The figures in the table have the following meanings:

0 = no fungus growth
1 = diameter of the fungus colony of 0.5 to 1 cm
2 = diameter of the fungus colony of 1 to 2 cm
3 = diameter of the fungus colony of 2 to 2.5 cm
4 = diameter of the fungus colony of 2.5 to 4.5 cm
5 = diameter of the fungus colony of 4.5 to 5 cm

| | *Rhizoctonia solani* percentage active ingredient in the agar | |
|---|---|---|
| Active ingredient | 0.025 | 0.01 |
| 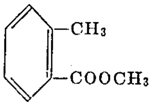 | 1 | 2 |
| 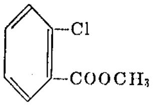 | 0 | 1 |

| Active ingredient | Rhizoctonia solani percentage active ingredient in the agar 0.025 | 0.01 |
|---|---|---|
| 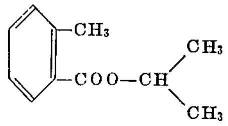 | 2 | 3 |
| 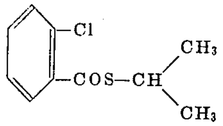 | 2 | 3 |
| 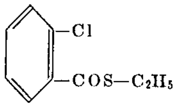 | 0 | 1 |
| 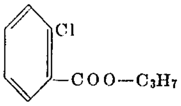 | 0 | 1 |
| 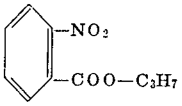 | 1 | 2 |
| 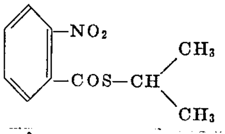 | 1 | 2 |
| 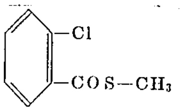 | 0 | 0 |
| 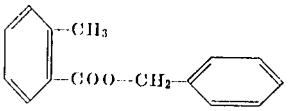 | 1 | 1 |
| 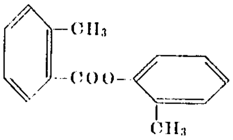 | 0 | 1 |
| 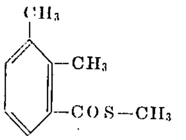 | 0 | 0 |
| 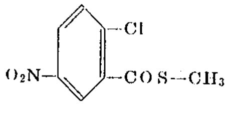 | 0 | 1 |
| Tetramethylthiuram disulfide (TMTD) (for comparison purposes) | 3 | 4 |
| Control (untreated) | 5 | |

EXAMPLE 2

Following the procedure described in Example 1, the active ingredients were dissolved in acetone and distributed in a malt nutrient agar. The agar was again poured into Petri dishes having a diameter of 5 cm and each dish was centrally inoculated with mycelium flakes of *Coniophora cerebella*. The dishes were incubated at 25°C and the extent of the development of the fungus colony was ascertained after 6 days.

The figures in the table have the following meanings:

0 = no fungus growth
1 = diameter of the fungus colony of 0.5 to 1 cm
2 = diameter of the fungus colony of 1 to 2 cm
3 = diameter of the fungus colony of 2 to 2.5 cm
4 = diameter of the fungus colony of 2.5 to 4.5 cm
5 = diameter of the fungus colony of 4.5 to 5 cm

| Active ingredient | Coniophora cerebella percentage active ingredient in the agar 0.025 | 0.01 |
|---|---|---|
| 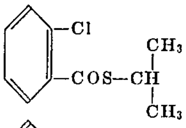 | 0 | 0 |
| 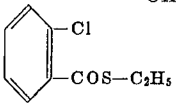 | 0 | 0 |
| 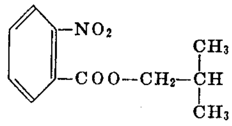 | 1 | 2 |
| 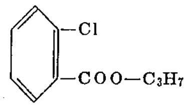 | 0 | 2 |
| 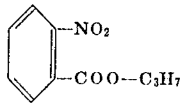 | 1 | 2 |
| 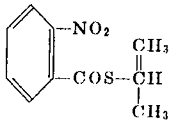 | 1 | 2 |
| 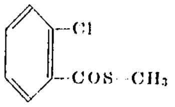 | 0 | 1 |
| 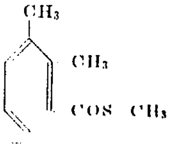 | 0 | 0 |
| 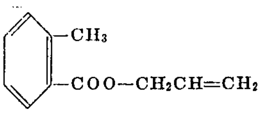 | 0 | 2 |
| Tetramethylthiuram disulfide (TMTD) (for comparison purposes) | 2 | 3 |
| Control (untreated) | 5 | |

EXAMPLE 3

The procedure was that adopted in Example 1. The fungus employed for the purposes of the experiment was *Sclerotium rolfsii*. The extent of the development of the fungus colony was ascertained after 4 days.

The figures in the table have the following meanings:
0 = no fungus growth
1 = diameter of the fungus colony of 0.5 to 1 cm
2 = diameter of the fungus colony of 1 to 2 cm
3 = diameter of the fungus colony of 2 to 2.5 cm
4 = diameter of the fungus colony of 2.5 to 4.5 cm
5 = diameter of the fungus colony of 4.5 to 5 cm

| Active ingredient | *Sclerotium rolfsii* percentage active ingredient in the agar | |
|---|---|---|
| | 0.025 | 0.01 |
| 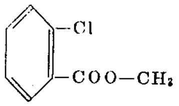 | 1 | 2 |
| 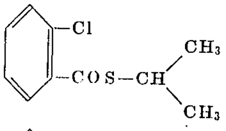 | 0 | 0 |
| 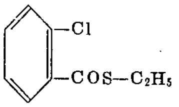 | 0 | 0 |
| 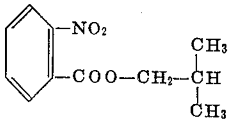 | 1 | 2 |
| 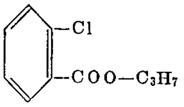 | 0 | 1 |
| 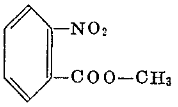 | 0 | 1 |
| 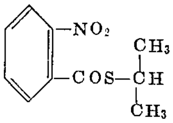 | 0 | 0 |
| 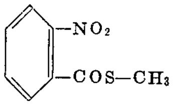 | 0 | 1 |
| 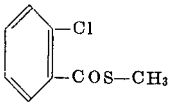 | 0 | 0 |
| 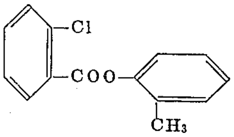 | 1 | 2 |
| 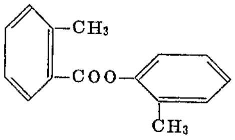 | 0 | 1 |
| 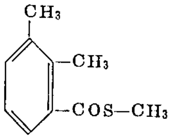 | 0 | 0 |
| 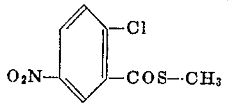 | 0 | 1 |
| Tetramethylthiuram disulfide (TMTD) (for comparison purposes) | 2 | 3 |
| Control (untreated) | 5 | |

EXAMPLE 4

The active ingredients, in amounts of 20 and 40 percent by weight, were thoroughly triturated with talc. 0.01 part by weight of spores of wheat bunt (*Tilletia tritici*) was uniformly distributed in 0.2 part by weight portions of the active ingredient/talc mixtures and the resultant mixtures were dusted onto 10 parts by weight of soaked and drained soil in Petri dishes having a diameter of 5 cm. The dishes were then kept in a refrigerator at 10° to 12°C. After 10 days the spores in the control dish (spore/talc mixture) had germinated, enabling the effectiveness of the agents to be determined according to the following table:

+++ strong germination, corresponding to the control
++ markedly reduced germination
+ considerably reduced germination, only occuring sporadically
o total inhibition of germination

| Active ingredient | Tilletia tritici percentage active ingredient in the mixture | |
|---|---|---|
| | 20 | 40 |
| 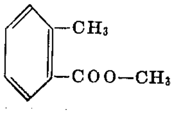 | 0 | 0 |
| 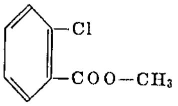 | 0 | 0 |
| 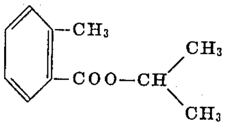 | 0 | 0 |
| 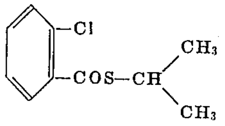 | 0 | 0 |
| 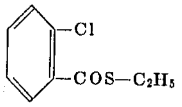 | 0 | 0 |
| 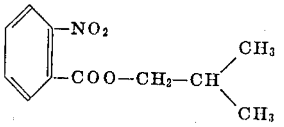 | 0 | 0 |
| 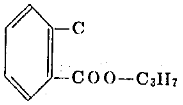 | 0 | 0 |
| 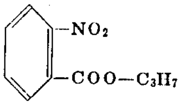 | 0 | 0 |

| Active ingredient | Tilletia tritici percentage active ingredient in the mixture 20 | 40 |
|---|---|---|
| 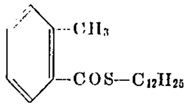 | + | 0 |
| 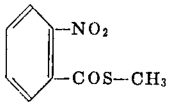 | ++ | + |
| 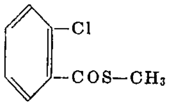 | 0 | 0 |
| 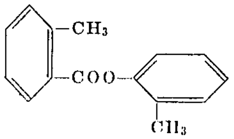 | 0 | 0 |
| 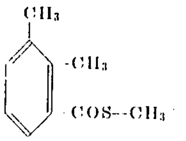 | 0 | 0 |
| 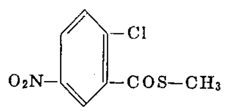 | 0 | 0 |
| 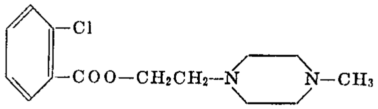 | 0 | 0 |
| 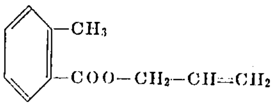 | 0 | 0 |
| Control (untreated) (spore/talc mixture) | +++ | +++ |

We claim:

1. A process for controlling fungi which comprises applying to plants, seeds, or seedlings an effective, fungi-toxic amount of a compound selected from the group consisting of thiomethyl 2,3-dimethylbenzoate
thiooctyl o-chlorobenzoate
2'isopropyl-5'-methylphenyl-2-methylbenzoate
isobutyl o-methylbenzoate
methyl-2-nitrobenzoate
3'-methylphenyl-2-chlorobenzoate
thioisopropyl-2-nitrobenzoate
propyl-2-nitrobenzoate
thiomethyl-2-chloro-5-nitrobenzoate
phenyl-2-methylbenzoate
thiophenyl-2-chlorobenzoate
isobutyl-2-chlorobenzoate
isobutyl-2-nitrobenzoate
thioethyl-2-chlorobenzoate
thioisopropyl2-chlorobenzoate
methyl-2-methylbenzoate
thiomethyl-2-methylbenzoate
thiomethyl-2-chlorobenzoate
thiomethyl-2-nitrobenzoate
ethyl-2-methylbenzoate
propyl-2-methylbenzoate
thioethyl-2-chlorobenzoate
isopropyl-2-methylbenzoate
allyl-2-methylbenzoate
thiododecyl-2-chlorobenzoate
thiooctyl-2-nitrobenzoate
2',3',4',5',6'-pentachlorophenyl-2-nitrobenzoate
4'-isooctylphenyl-2-methylbenzoate
methyl2-chlorobenzoate
thiododecyl-2-methylbenzoate
propyl-2-chlorobenzoate
benzyl-2-methylbenzoate
2'-methylphenyl-2-methylbenzoate and
2'methylphenyl-2-chlorobenzoate 2. A process for controlling fungi which comprises applying to plants, seeds or seedlings an effective, fungitoxic amount of a compound having the formula

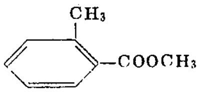

3. A process for controlling fungi which comprises applying to plants, seeds or seedlings an effective, fungitoxic amount of a compound having the formula

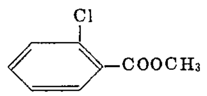

* * * * *